Nov. 20, 1962  E. W. LEHMANN ETAL  3,065,403
PHASE SHIFTING DEVICE
Filed Oct. 17, 1958

EMIL W. LEHMANN
FRANCIS P. FINLON
INVENTOR.

BY

ATTORNEYS

United States Patent Office 3,065,403
Patented Nov. 20, 1962

3,065,403
PHASE SHIFTING DEVICE
Emil W. Lehmann, Princeton, N.J., and Francis P. Finlon, State College, Pa., assignors, by mesne assignments, to the United States of America as represented by the Secretary of the Navy
Filed Oct. 17, 1958, Ser. No. 768,003
2 Claims. (Cl. 323—122)

The present invention relates to apparatus for controlling the phase of an alternating current or potential for use in both high and low frequency systems.

Phase shifters for producing a variable phase shift are well known and exist in a variety of forms; however, such phase shifters, as a rule, are characterized by relative complexity and variable output and are sensitive to frequency variations. The present invention provides a system which is relatively simple, economical, dependable, effective over any desired angular range to provide constant amplitude, and is independent of frequency. The present invention, in general, provides a plurality of variable resistors, the variation in resistors and relative values being such that effective phase shift is provided and is of general application in electron control and regulating systems. The present invention is particularly adaptable for use in connection with sweep circuits of cathode ray tubes and testing of electric circuits wherein it is desirable or necessary to provide a voltage of constant amplitude, variable frequency, and adjustable in phase from 0 degrees to 360 degrees.

The present invention contemplates means for dividing the signal to be shifted into four voltages in quadrature, supplying each of these voltages to one of four ganged potentiometers having sinusoidal resistance functions related one to another in a predetermined manner, and combining the output voltage of each potentiometer to form a single output signal which is constant in amplitude, independent of frequency, and which has a selectable phase angle proportional to the amount of rotation or adjustment of the potentiometers.

It is an object of the present invention to provide a new and improved electric phase shifting circuit.

It is a further object of the present invention to provide a new and improved electric phase shifting device of the static impedance type in which the output voltage may be varied through 360 electrical degrees relative to the input voltage.

It is another object of the present invention to provide an improved electric phase shifting device which is simple in assembly and operation and which requires only variable resistances to obtain a phase variation of 360 electrical degrees.

A further object of the present invention is to provide a phase shifting device capable of changing the phase angle of an alternating current between 0 degrees and 360 degrees while maintaining the amplitude of the current substantially constant and wherein the aforementioned phase angle is proportional to mechanical rotation of a shaft.

Other objects and many of the attendant advantages of our invention would be readily appreciated as the same becomes better understood by reference to the following detailed description when considered in connection with the accompanying drawing wherein:

FIGURE 1 diagrammatically illustrates an embodiment of the invention and shows the input voltages and output voltage.

Figure 1:
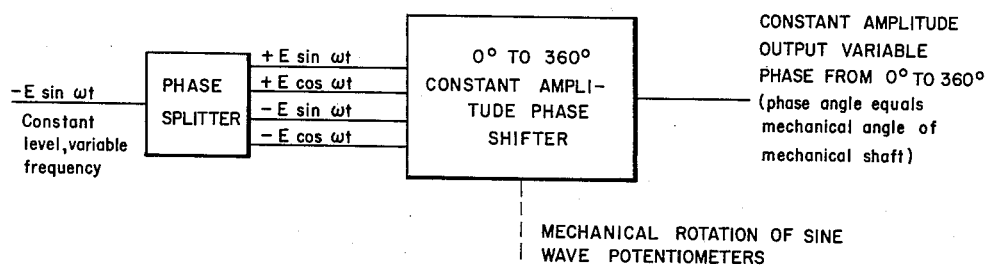
Figure 2:
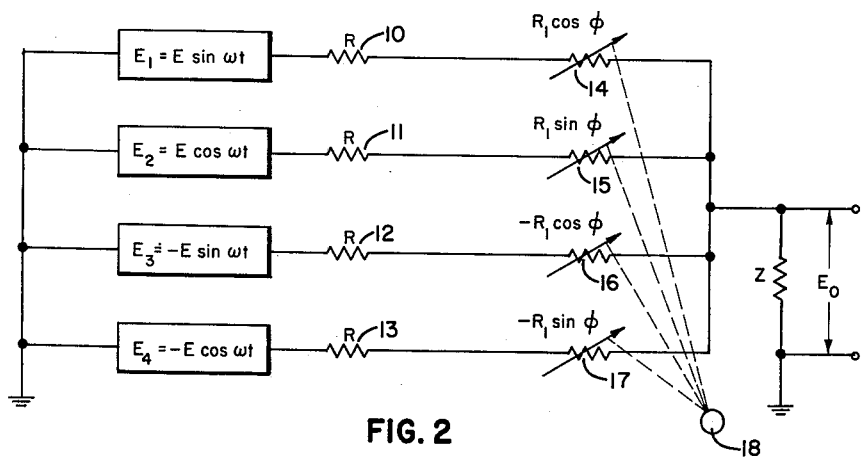
FIGURE 2 is a diagram showing the basic construction of a phase shifting device according to the invention.

With particular reference now to FIGURE 1 and FIGURE 2, a variable frequency supply voltage of, for example, $-E \sin \omega t$, having a constant level and variable frequency, is supplied in any conventional manner to a phase splitter having four output voltages at 0 degree, 90 degrees, 180 degrees, and 270 degrees. The manner of providing the four in quadrature is not essential to the invention so long as the 90-degree relationship is maintained, but a preferable means for supplying such voltages in quadrature is disclosed and claimed in our copending patent application, Serial No. 768,002, filed concurrently with this application, and now Patent No. 3,041,547. The four voltages in quadrature are shown diagrammatically and designated in FIGURE 2 as $E_1 = E \sin \omega t$, $E_2 = E \cos \omega t$, $E_3 = -E \sin \omega t$, and $E_4 = -E \cos \omega t$. These four voltages are each supplied through separate and equal resistors 10—11—12—13 to one of four sine wave potentiometers 14—15—16—17 resistively related as, for example, as shown in FIGURE 2, the purpose and value of each resistor 10—11—12—13 being more conveniently and thoroughly discussed hereinafter. Each potentiometer is so designed that an output potential therefrom is a sinusoidal function of potentiometer adjustment. Such potentiometers are available in the market in a variety of forms. Thus, in one form, a resistance is tapered so that equal movements of the wiper produce variations of resistance which are sinusoidally related. In another form, a conventional potentiometer may have the wiper operated by a mechanical system which converts a simple mechanical movement into a wiper movement sinusoidally related. There is also the well known potentiometer wherein a square sheet of insulating material 21 has resistance wire 22 wound thereon, a wiper 23 being pivoted at the center on a shaft 18 and playing over the resistance wire 22 as shown by way of example in FIGURE 3. Contact point 20 of wiper 23 at the extremity of its swing contacts point 24 on resistance wire 22 to produce the minimum resistance of the potentiometer. Current passes through resistor R′ by point 25 into the potentiometer and leaves through contact point 20 and wiper 23, utimately reaching impedance Z.

Each sine wave potentiometer, or the wiper thereof, is adjusted such that with respect to the voltages, $E_1$, $E_2$, $E_3$, and $E_4$ as shown in FIGURE 2, there is respectively provided to receive each voltage, one of a total of four sine wave potentiometers 14—15—16—17 having a resistive relationship one with another of $R_1 \cos \phi$, $R_1 \sin \phi$, $-R_1 \cos \phi$, and $-R_1 \sin \phi$. For the relationship of voltages and potentiometers as shown in FIGURE 2, it is necessary that each voltage have its potentiometer initially adjusted as shown in FIGURE 2 and described hereinabove. The output voltages of the sine wave potentiometers are combined and an output voltage $E_0$ is taken across an impedance Z, the phase angle of $E_0$ being dependent upon and determined by the amount of rotation of the shaft 18 common to each potentiometer.

Figure 3:
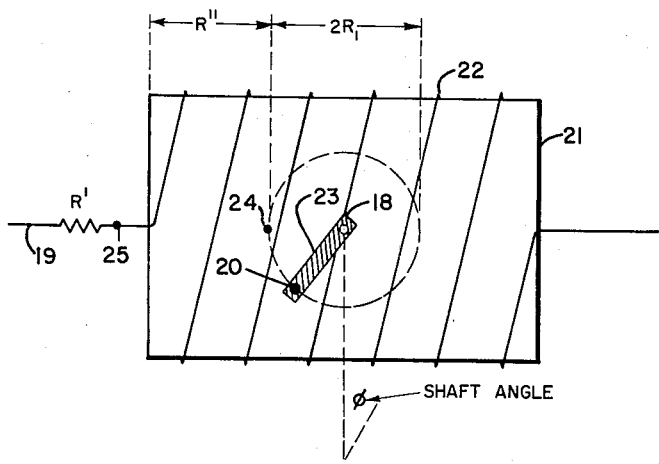
FIGURE 3 is a partial view illustrating the construction of an adjustable potentiometer for use in a system according to FIGURE 2.

To further facilitate understanding of the invention and with reference now to FIGURE 2 and FIGURE 3, where the construction details of a sine (or cosine) potentiometer is shown, the resistance between point 24 and point 20 may be expressed as:

$$R_{24-20} = R_1 - R_1 \sin \phi \quad (1)$$

The total resistance between points 19 and 20 in FIGURE 4 may be expressed as:

$$R_{19-20} = R_T = R' + R'' + R_1 - R_1 \sin \phi \quad (2)$$

which for convenience may be simplified by letting $$R = R' + R'' + R_1 \quad (3)$$

to
$$R_{19-20} = R_T = R - R_1 \sin \phi \quad (4')$$

Equation 4 is utilized to draw the simplified circuit for the bottom leg of the circuit illustrated in FIGURE 2. By similar methods, the resistance values shown in FIGURE 2 for the other legs may be determined. The difference between the leg's resistance is the mechanical alignment of the potentiometers with one another and the phase of the input signals.

From the above it follows that:

$$\frac{E_0}{Z} = \frac{E_1 - E_0}{R + R_1 \cos \phi} + \frac{E_2 - E_0}{R + R_1 \sin \phi} + \frac{E_3 - E_0}{R - R_1 \cos \phi} + \frac{E_4 - E_0}{R - R_1 \sin \phi} \quad (4)$$

Let $$A \equiv \frac{R}{R_1}; \quad E_1 = -E_3; \quad E_2 = -E_4 \quad (5)$$

Therefore, $$Y_1 \equiv \frac{1}{R + R_1 \cos \phi} = \frac{1}{R_1 (A + \cos \phi)} \quad (6)$$

$$Y_2 \equiv \frac{1}{R + R_1 \sin \phi} = \frac{1}{R_1 (A + \sin \phi)} \quad (7)$$

$$Y_3 \equiv \frac{1}{R - R_1 \cos \phi} = \frac{1}{R_1 (A - \cos \phi)} \quad (8)$$

$$Y_4 \equiv \frac{1}{R - R_1 \sin \phi} = \frac{1}{R_1 (A - \sin \phi)} \quad (9)$$

Substituting Equations 5, 6, 7, 8 and 9 into 4, it may be shown that $$E_0 = \frac{E_1(Y_1 - Y_3) + E_2(Y_2 - Y_4)}{\frac{1}{Z} + [Y_1 + Y_2 + Y_3 + Y_4]} \quad (10)$$

The bracketed terms in Equation 10 may be evaluated using Equations 6, 7, 8 and 9. The results are given below:

$$Y_1 - Y_3 = \frac{1}{R_1}\left(\frac{1}{A + \cos \phi} - \frac{1}{A - \cos \phi}\right) = \frac{-2 \cos \phi}{R_1(A^2 - \cos^2 \phi)} \quad (11)$$

$$Y_2 - Y_4 = \frac{1}{R_1}\left(\frac{1}{A + \sin \phi} - \frac{1}{A - \sin \phi}\right) = \frac{-2 \sin \phi}{R_1(A^2 - \sin^2 \phi)} \quad (12)$$

$$Y_1 + Y_2 + Y_3 + Y_4$$
$$= \frac{1}{R_1}\left(\frac{1}{A + \cos \phi} + \frac{1}{A + \sin \phi} + \frac{1}{A - \cos \phi} + \frac{1}{A - \sin \phi}\right) \quad (13)$$

$$= \frac{1}{R_1}\left(\frac{2A}{A^2 - \cos^2 \phi} + \frac{2A}{A^2 - \sin^2 \phi}\right) \quad (14)$$

Using Equations 11, 12 and 14, Equation 10 may be expressed as $$E_0 = \frac{\frac{-2E}{R_1}\left[(\sin \omega t \cos \phi)\left(\frac{1}{A^2 - \cos^2 \phi}\right) + (\cos \omega t \sin \phi)\left(\frac{1}{A^2 - \sin^2 \phi}\right)\right]}{\frac{1}{Z} + \frac{2A}{R_1}\left(\frac{1}{A^2 - \cos^2 \phi} + \frac{1}{A^2 - \sin^2 \phi}\right)} \quad (15)$$

When $A > 10$, Equation 15 may be simplified to $$E_0 \cong \frac{-2EZ}{A^2 R_1 + 4AZ} \sin (\omega t + \phi) = \frac{-2E}{A\left(A\frac{R_1}{Z} + 4\right)} \sin (\omega t + \phi) \quad (16)$$

From Equation 16 it may now be obvious that when $R/R_1$ is greater than 10, the amplitude of $E_0$ is independent of phase angle and frequency and its phase angle differs from the phase angle of the input voltage ($E_3$ for the case shown) by the mechanical shaft angle through which the potentiometers have been rotated. The resistance of each resistor 10—11—12—13 in series with each potentiometer is selected to be of such value that $$A = \frac{R}{R_1}$$

is greater than 10 whereby Equation 16 may be rendered valid. It is to be here noted and understood that by interchanging the positions of $E_1$, $E_2$, $E_3$, and $E_4$, it is possible in a manner similar to that described hereinabove to make the time function of $E_0$ equal to sine $(\omega t - \phi)$, cos $(\omega t + \phi)$, or $(\omega t - \phi)$.

In operation of the four voltages $E_1$, $E_2$, $E_3$ and $E_4$ in quadrature are applied to the circuit producing a current flow through resistors 10, 11, 12 and 13; through the sine wave potentiometers 14, 15, 16 and 17; and impedance Z. The rotation of the shaft 18 produces a sinusoidally related change in the variable resistances as above-described, and in so doing changes sinusoidally the current passing through each leg of the device. Hence, the root mean square of the current will vary sinusoidally as the variable potentiometer is rotated through 360°. As is obvious from the above mathematical derivation and common knowledge of the prior art, the vector component of the current produced by $E_1$ across impedance Z may be lengthened or shortened depending upon the angle that shaft 18 is turned. This is also true of current passing through potentiometers 15, 16 and 17. Thus, by turning shaft 18, it is possible to vary the vector voltage components of each quadrature voltage as described, and in so doing, to vary the vector sum of the voltages producing final voltage $E_0$. By means of this variation of component current and voltages of the circuit's four legs, it is possible to produce a resultant vectorial component of voltage at $E_0$ that may be rotated 360° by the mere turning of shaft 18. The above described operation of this device is obvious from the previous description and equations.

While the present invention has been described in its preferred embodiment, it is realized that modifications may be made, and it is desired that it be understood that no limitations on the invention are intended other than may be imposed by the scope of the appended claims.

Having now disclosed our invention, what we claim as new and desire to secure by Letters Patent of the United States is:

1. A continuously variable phase shifter having a substantially constant output comprising in combination: a phase splitting device adapted to produce four sinusoidal voltages in quadrature, having the respective relationship with one another of $E$ sine $\omega t$, $E$ cosine $\omega t$, $-E$ sine $\omega t$ and $-E$ cosine $\omega t$, where E is the impressed voltage and $\omega t$ the phase angle thereof; four fixed resistors, each connected in series with one each of said sinusoidal voltages; four variable potentiometers, each connected in series with one each of said fixed resistors; a shaft means associated with each of said four potentiometers, the turning of which produces in said potentiometers a resistive relationship one with the other of $R_1 \cos \phi$, $R_1$ sine $\phi$, $-R_1 \cos \phi$ and $-R_1 \sin \phi$ respectively, where $\phi$ is the shaft angle of said shift means and $R_1$ the maximum resistive value of each of said potentiometers; a single summing resistance connected to the output of each of said variable potentiometers adapted to reflect a single output signal voltage, whereby the phase angle of said output signal voltage equals the shaft angle of said shaft means.

2. The combination as defined in claim 1 wherein said four variable potentiometers are comprised of a flat sheet; resistance wire consecutively wound on said sheet; a rotatable wiper pivoted upon said sheet adapted to electrically contact said resistance wire in a circular pattern.

References Cited in the file of this patent

UNITED STATES PATENTS

| | | |
|---|---|---|
| 2,722,659 | Dickey et al. | Nov. 1, 1955 |
| 2,763,830 | Pihl | Sept. 18, 1956 |